US010363867B2

(12) United States Patent
Salter et al.

(10) Patent No.: US 10,363,867 B2
(45) Date of Patent: Jul. 30, 2019

(54) PRINTED LED TRIM PANEL LAMP

(71) Applicant: Ford Global Technologies, LLC, Dearborn, MI (US)

(72) Inventors: Stuart C. Salter, White Lake, MI (US); Annette Lynn Huebner, White Lake, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 737 days.

(21) Appl. No.: 14/824,463

(22) Filed: Aug. 12, 2015

(65) Prior Publication Data

US 2015/0343944 A1 Dec. 3, 2015

Related U.S. Application Data

(63) Continuation-in-part of application No. 14/603,636, filed on Jan. 23, 2015, now Pat. No. 9,573,517, which
(Continued)

(51) Int. Cl.
*H05B 37/02* (2006.01)
*B60Q 3/54* (2017.01)
*B60Q 3/53* (2017.01)
*B60Q 3/68* (2017.01)
*B60Q 3/208* (2017.01)
(Continued)

(52) U.S. Cl.
CPC ............... *B60Q 3/53* (2017.02); *B60Q 3/208* (2017.02); *B60Q 3/217* (2017.02); *B60Q 3/68* (2017.02); *B60Q 3/76* (2017.02); *B60Q 3/80* (2017.02); *H05B 37/0218* (2013.01); *H05B 37/0227* (2013.01); *B60Q 2400/40* (2013.01); *Y02B 20/46* (2013.01)

(58) Field of Classification Search
CPC ... B60Q 3/80; B60Q 3/74; B60Q 3/82; B60Q 3/20; B60Q 3/85; B60Q 3/00; B60Q 3/43; B60Q 2400/40; B60Q 2500/10; H05B 37/02; F21Y 2115/10; F21S 43/14; F21S 41/192; F21S 41/147
USPC ............. 315/77, 84, 76; 307/10.8, 10.1, 9.1; 362/464, 487, 545, 459, 488
See application file for complete search history.

(56) References Cited

U.S. PATENT DOCUMENTS 2,486,859 A 11/1949 Meijer et al.
4,758,931 A 7/1988 Gabaldon
(Continued)

FOREIGN PATENT DOCUMENTS

CN 101337492 A 1/2009
CN 201169230 Y 2/2009
(Continued)

*Primary Examiner* — Wei (Victor) Chan
*Assistant Examiner* — Henry Luong
(74) *Attorney, Agent, or Firm* — Vichit Chea; Price Heneveld LLP

(57) ABSTRACT

An illumination apparatus for a vehicle is disclosed. The illumination apparatus comprises a circuit disposed on a trim panel. The illumination apparatus comprises at least one light source formed by plurality of LEDs in a semiconductor ink. The illumination apparatus further comprises at least one proximity sensor disposed proximate a surface of the trim panel and configured to selectively activate the at least one circuit. The trim panel is configured to receive at least one edge of a window of the vehicle.

16 Claims, 7 Drawing Sheets

Related U.S. Application Data is a continuation-in-part of application No. 14/086,442, filed on Nov. 21, 2013, now abandoned.

(51) Int. Cl.
  *B60Q 3/217* (2017.01)
  *B60Q 3/76* (2017.01)
  *B60Q 3/80* (2017.01)

(56) References Cited

U.S. PATENT DOCUMENTS

| | | |
|---|---|---|
| 5,053,930 A | 10/1991 | Benavides |
| 5,434,013 A | 7/1995 | Fernandez |
| 5,599,086 A * | 2/1997 | Dutta ............... B60Q 3/53 296/214 |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,294,990 B1 | 9/2001 | Knoll et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,382,350 B2 | 2/2013 | Gold |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,452,709 B2 | 9/2016 | Aburto Crespo |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0095415 A1 * | 5/2003 | Carter ............... B60Q 1/323 362/488 |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2006/0209551 A1 | 9/2006 | Schwenke et al. |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2010/0232171 A1 * | 9/2010 | Cannon ............... B29C 45/1418 362/509 |
| 2011/0012062 A1 | 1/2011 | Agrawal et al. |
| 2011/0025951 A1 * | 2/2011 | Jones ............... H01L 33/50 349/70 |
| 2011/0115376 A1 * | 5/2011 | Shiratsuchi ............... B60Q 3/74 315/77 |
| 2011/0241544 A1 * | 10/2011 | Murray ............... B60Q 1/323 315/77 |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0044457 A1 * | 2/2013 | Hikmet ............... H01L 33/50 362/84 |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |

(56) References Cited

U.S. PATENT DOCUMENTS

| | | |
|---|---|---|
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2016/0240794 A1 | 8/2016 | Yamada et al. |
| 2017/0158125 A1 | 6/2017 | Schuett et al. |
| 2017/0253179 A1 | 9/2017 | Kumada |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

\* cited by examiner

PRINTED LED TRIM PANEL LAMP

CROSS-REFERENCE TO RELATED APPLICATIONS

This application is a continuation-in-part of U.S. patent application Ser. No. 14/603,636, filed Jan. 23, 2015, now U.S. Pat. No. 9,573,517, and entitled "DOOR ILLUMINATION AND WARNING SYSTEM," which is a continuation-in-part of U.S. patent application Ser. No. 14/086,442, filed Nov. 21, 2013, now U.S. Patent Application Publication No. 2015/0138789 A1, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present disclosure generally relates to vehicle lighting systems, and more particularly, to vehicle lighting systems having thin profiles that may be operable to conform to flexible materials and/or surfaces.

BACKGROUND OF THE INVENTION

Lighting in vehicles traditionally has been applied to provide illumination for reading, vehicle entry, and operation. However, lighting may also be applied to improve vehicle features and systems to ensure that vehicle passengers, operators, and onlookers have an improved experience. Such improvements may arise from improvements in safety, visibility, aesthetics, and/or features. The disclosure provides for a lighting system that may be operable to illuminate a portion of a vehicle in response to a detection of an approaching or departing occupant.

SUMMARY OF THE INVENTION

According to one aspect of the present disclosure, an illumination apparatus for a vehicle is disclosed. The illumination apparatus comprises a circuit disposed on a trim panel. The illumination apparatus comprises at least one light source formed by plurality of LEDs in a semiconductor ink. The illumination apparatus further comprises at least one proximity sensor disposed proximate a surface of the trim panel and configured to selectively activate the at least one circuit. The trim panel is configured to receive at least one edge of a window of the vehicle.

According to another aspect of the present disclosure, an illumination apparatus for a vehicle is disclosed. The illumination apparatus comprises a circuit disposed on a window molding disposed in a door. The illumination apparatus comprises plurality of light sources, at least one proximity sensor, and a controller. The proximity sensor is disposed proximate a surface of the trim panel. The controller is in communication with the at least one proximity sensor to control at least a first light source of the plurality of light sources. The controller is configured to selectively illuminate the first light source in response to a proximity detection and to control at a second light source in response to a door open status signal.

According to yet another aspect of the present disclosure, a lighting apparatus for a vehicle is disclosed. The lighting apparatus comprises a locating mechanism configured to retain a position of the circuit assembly along a longitudinal extent of the trim panel. The apparatus further comprises at least one light source disposed on the circuit assembly conductively connected to a plurality of electrodes disposed on the trim panel. The circuit assembly is configured to be adjustable in position along the longitudinal extent.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
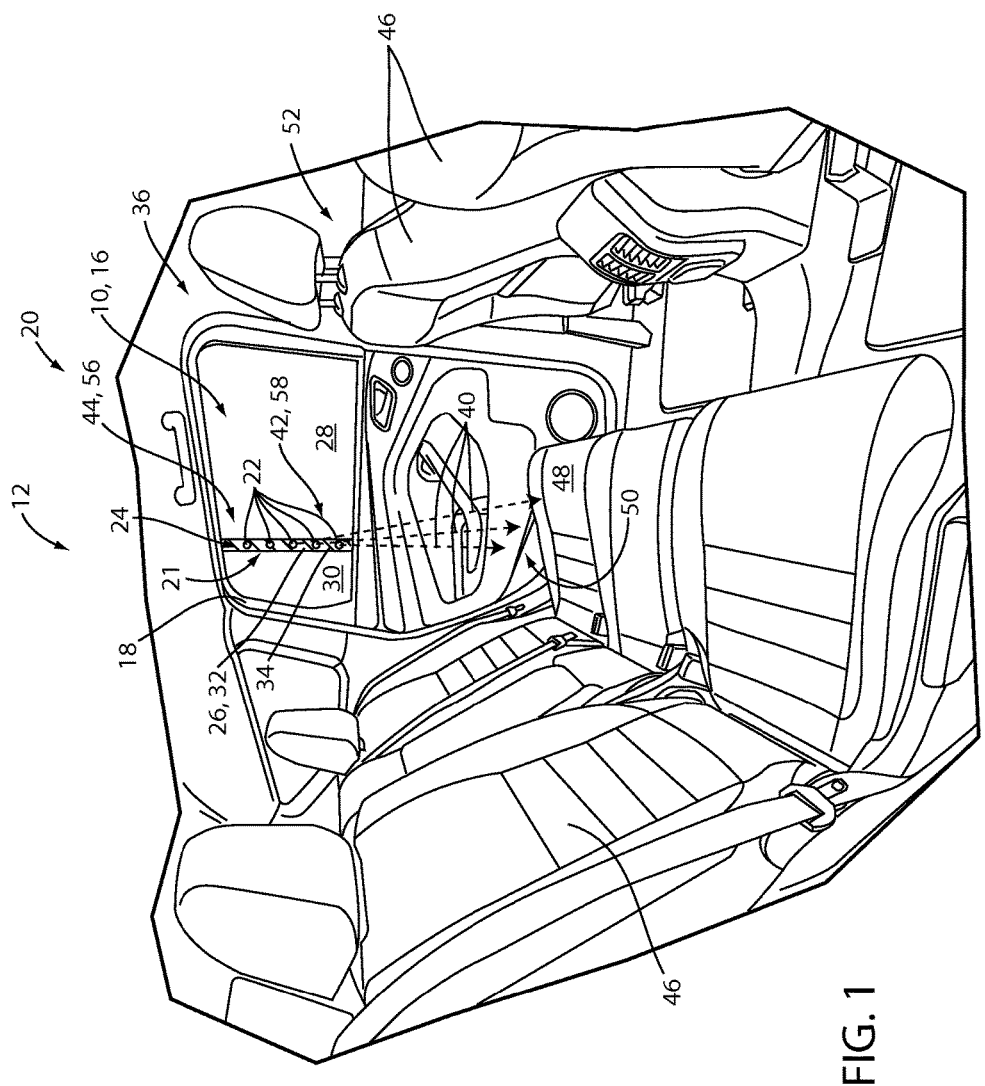
FIG. 1 is a side perspective view of an interior of a vehicle comprising a illumination apparatus.
Figure 2:
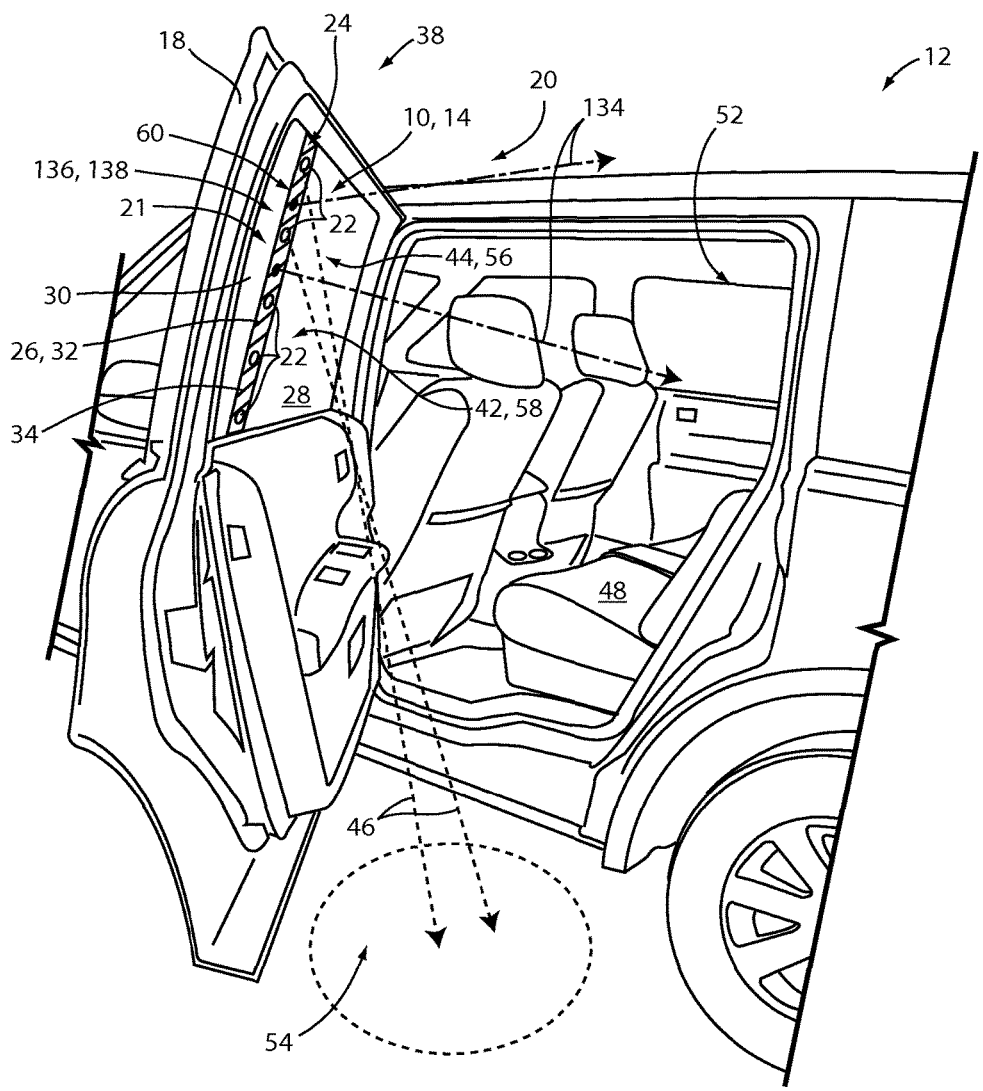
FIG. 2 is a side perspective view of an exterior of a vehicle comprising a illumination apparatus.

Referring to FIGS. 1 and 2, an illumination apparatus 10 for a vehicle 12 is disclosed. The illumination apparatus 10 may be configured to illuminate a portion of the vehicle and in some embodiments may be configured to provide an entry light 14 or puddle light function as well as an interior light 16 or map light function. The entry light 14 or puddle light function may be selectively activated when a door 18 of the vehicle 12 is arranged in an open position. The interior light 16 or map light may be selectively activated when the door 18 is arranged in a closed position.

The illumination apparatus 10 may be in communication with a controller to form an illumination system 20. The controller may selectively activate the illumination apparatus 10 in response to one or more door position sensors operable to detect when the door is arranged in the open or closed position. A door position sensor as discussed herein may correspond to one or more proximity sensor, contact sensors, and/or various other sensors that may be configured to detect the door 18 in the closed position. Additionally, the controller may be in communication with one or more input sensors 21, for example a proximity sensor, configured to receive an input to activate the illumination apparatus 10. In some embodiments, the one or more input sensors 21 may be incorporated as integral components of the illumination apparatus 10. The various embodiments of the illumination apparatus 10 may provide for various beneficial features that may be utilized to illuminate the vehicle 12. An exemplary embodiment of the controller is discussed in reference to FIG. 7.

The illumination apparatus 10 may comprise a plurality of light sources 22 in communication with a circuit 24 disposed proximate a trim panel 26 of the vehicle. The trim panel 26 may correspond to a window trim panel 26 configured to engage at least a first window 28 of the vehicle 12. In some embodiments, the trim panel 26 may be configured to engage the first window 28 and a second window 30. The trim panel 26 may slidably engage at least one of the first window 28 and the second window 30, and may correspond to a window molding 32. The trim panel 26 may be configured to seal the first window 28 to the second window 30. For example, the first window 28 may be configured to slidably engage the trim panel 26 such that the first window 28 may be retracted into the door 18.

The plurality of light sources 22 may be configured as directional emitters having a thin profile. The light sources 22 may be connected to and/or form a portion of an interior surface 34 of the trim panel 26. In this configuration, the light sources 22 may form a light emitting layer disposed on the interior surface 34 and configured to illuminate a portion of the vehicle 12 or region proximate thereto. The light sources 22 of the illumination apparatus 10 may be configured to provide functional and/or decorative lighting to illuminate the vehicle 12.

FIGS. 1 and 2 demonstrate a projected interior view of the vehicle 12 with the door 18 in a closed position 36 and a projected exterior view of the vehicle 12 with the door 18 arranged in an opened position 38. In the opened position 38, the illumination apparatus 10 may be configured to selectively illuminate a first portion 42 or first light of the illumination apparatus 10. The first portion 42 may comprise one or more light sources of the plurality of light sources 22. The first portion 42 may be configured to emit light to provide for the interior light 16 or map light function. The light emitted from the interior light 16 may be referred to as an interior emission 40. Further details describing an exemplary embodiment of the illumination apparatus 10 are discussed in reference to FIG. 5.

The controller may be operable to activate the interior light 16 in response to an input received by the one or more input sensors 21 in communication with the controller. Additionally, the controller may selectively activate the illumination apparatus 10 in response to one or more states of the vehicle 12. For example, the controller may be in communication with the door position sensor via a communication bus. In this configuration, the controller may illuminate the first portion 42 of the illumination apparatus 10 or the interior light in response to various states of the vehicle 12. For example, the communication bus may be configured to communicate to the controller a drive selection of the vehicle, an ignition state, a door open or ajar status, a remote activation of the illumination apparatus 10, or any other information or control signals that may be utilized to activate or adjust an emission from the illumination apparatus 10.

Referring to FIG. 2, in the closed position 36, the illumination apparatus 10 may be configured to selectively illuminate a second portion 44 or second light of the illumination apparatus 10. The second portion 44 may comprise one or more light sources of the plurality of light sources 22. The second portion 44 may be configured to emit light to provide for the entry light 14 or puddle light function. The light emitted from the entry light 14 may be referred to as an exterior emission 46. Though discussed in reference to the interior emission 40 and the exterior emission 46, the illumination apparatus may be configured to selectively illuminate one or more of the plurality of light sources 22 in response to the input sensor 21, the door position sensor, and/or various signals and states of the vehicle via the communication bus. As such, the particular control schemes and descriptions of the various functions of the illumination apparatus 10 are intended for illustration and should not be interpreted as limiting the disclosure.

Each of the entry light 14 and the interior light 16 may be advantageously directed to serve as task lighting corresponding to the reading or map light and the entry or puddle light, respectively. As illustrated in FIG. 1, in the closed position 36, the interior light 16 emitted from the first portion 42 may be directed substantially toward a portion of a passenger seat 48, which may correspond to a passenger work area 50 or area where a seated passenger may comfortably hold a book or map for reading while seated in the passenger seat 48. In this configuration, the interior light 16 may be selectively activated to illuminate the passenger work area 50 while limiting light emitted throughout a passenger compartment 52 of the vehicle 12.

As illustrated in FIG. 2, the entry light 14 may be emitted from the second portion 44 directed substantially toward an entry region 54 proximate the door 18 to illuminate at least a portion of the entry region 54. The second portion 44 may correspond to an upper portion 56 of the trim panel 26, while the first portion 42 may correspond to a lower portion 58 of the illumination apparatus 10. In this arrangement, an arched configuration 60 of the trim panel 26 may be configured to direct the exterior emission 46 downward toward the entry region 54. The arched configuration may direct the exterior emission 46 substantially downward or substantially parallel relative a vertical vector of the vehicle 12 with respect to gravity. In this configuration, the illumination apparatus 10 may be configured to provide a combination of lighting functions including the entry light 14 and the interior light 16.

Figure 3:
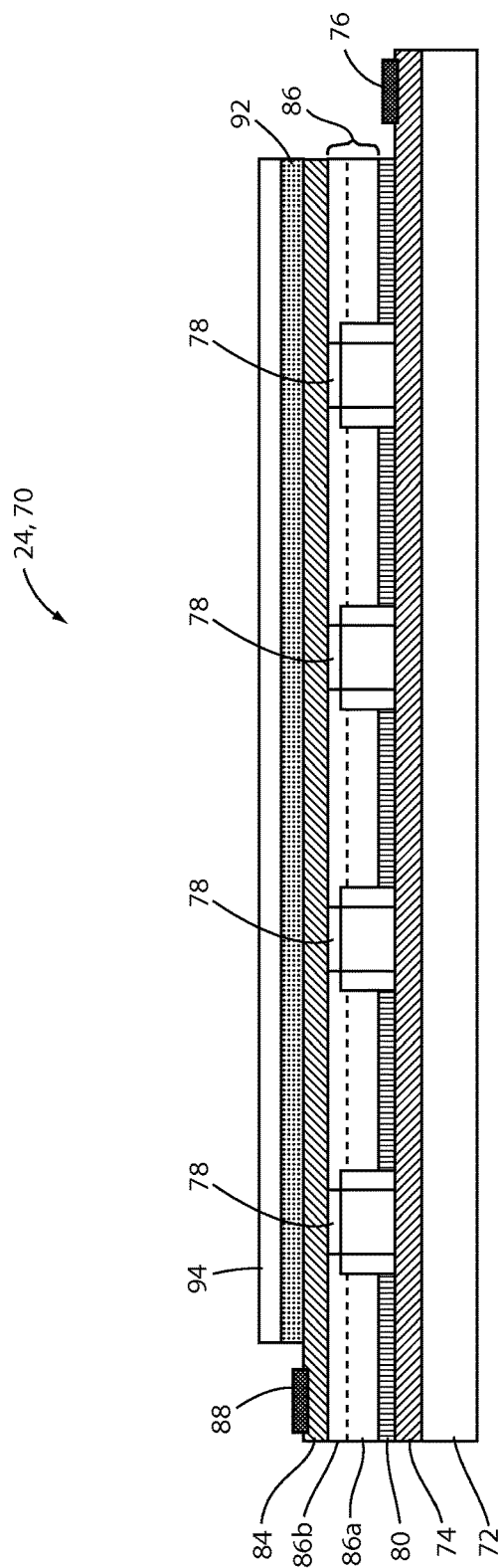
FIG. 3 is a side cross-sectional view of an illumination apparatus.

Referring to FIG. 3, a light generating device 70 of the illumination apparatus 10 may correspond to a thin-film or printed light emitting diode (LED) assembly. The light generating device 70 may correspond to the light source 22 as discussed in reference to FIGS. 1 and 2. The light generating device 70 may comprise the circuit 24 having a substrate 72. The substrate 72 may be opaque, transparent, or semi-transparent and may be thin. The light generating device 70 may be utilized in a variety of applications and may have a thin overall thickness. The substrate 72 may be of a polymer, for example polycarbonate, poly-methyl methacrylate (PMMA), polyethylene terephthalate (PET), etc. In some embodiments, the substrate 72 may be dispensed from a roll to provide for integration into assembly operations for the light generating device 70 and may be approximately 0.1 mm to 1.5 mm thick.

A first electrode 74 or conductive layer may be disposed on the substrate 72. The first electrode 74 and/or various electrodes or conductive layers discussed herein may comprise a conductive epoxy, such as a silver-containing or copper-containing epoxy. The first electrode 74 may be conductively connected to a first bus bar 76. The first bus bar 76 and other bus bars or conduits discussed herein may be of metallic and/or conductive materials, which may be screen printed on the electrodes or conductive layers. The bus bars may be utilized in the light generating device 70 to conductively connect a plurality of light-emitting diode (LED) emitters 78 to a power source via the controller. In this way, the first bus bar 76, and other bus bars utilized in the light producing assembly, may be configured to uniformly deliver current along and/or across a surface of the light generating device 70.

The LED emitters 78 may be printed, dispersed or otherwise applied to the first electrode 74 via a semiconductor ink 80. The semiconductor ink may correspond to a liquid suspension comprising a concentration of the LED emitters 78 dispersed therein. The concentration of the LED emitters 78 may vary based on a desired emission intensity of the light generating device 70. The LED emitters 78 may be dispersed in a random or controlled fashion within the semiconductor ink 80. The LED emitters 78 may correspond to micro-LEDs of gallium nitride elements, which may be approximately 5 microns to 400 microns across a width substantially aligned with the surface of the first electrode 74. The semiconductor ink 80 may include various binding and dielectric materials including but not limited to one or more of gallium, indium, silicon carbide, phosphorous and/or translucent polymeric binders. In this configuration, the semiconductor ink 80 may contain various concentrations of LED emitters 78 such that a surface density of the LED emitters 78 may be adjusted for various applications.

In some embodiments, the LED emitters 78 and semiconductor ink 80 may be sourced from Nth Degree Technologies Worldwide Inc. The semiconductor ink 80 may be applied through various printing processes, including ink jet and silk screen processes to selected portion(s) of the substrate 72. More specifically, it is envisioned that the LED emitters 78 may be dispersed within the semiconductor ink 80, and shaped and sized such that a substantial quantity of them preferentially align with the first electrode 74 and a second electrode 84 during deposition of the semiconductor ink 80. The portion of the LED emitters 78 that ultimately are electrically connected to the electrodes 74, 84 may be illuminated by a voltage source applied across the first electrode 74 and the second electrode 84. In some embodiments, a power source derived from a vehicular power source may be employed as a power source to supply current to the LED emitters 78. Additional information regarding the construction of a light producing assembly similar to the light generating device 70 is disclosed in U.S. Patent Publication No. 2014/0264396 A1, now U.S. Pat. No. 9,299,887, to Lowenthal et al., entitled "ULTRA-THIN PRINTED LED LAYER REMOVED FROM SUBSTRATE," filed Mar. 12, 2014, the entire disclosure of which is incorporated herein by reference.

At least one dielectric layer 86 may be printed over the LED emitters 78 to encapsulate and/or secure the LED emitters 78 in position. The at least one dielectric layer 86 may correspond to a first dielectric layer 86a and a second dielectric layer 86b, which may be of a substantially transparent material. The second electrode 84 may correspond to a top transparent conductive layer printed over the dielectric layer 86 to electrically connect the electrodes 74, 84. The second electrode 84 may be conductively connected to a second bus bar 88. The bus bars 76, 88 may be utilized in the light generating device 70 to conductively connect a plurality of LED emitters 78 to the power source via the controller. Though the plurality of LED emitters 78 are discussed as connected to the controller via the bus bars 76, 88, in some embodiments, the controller may supply current to the LED emitters 78 via various forms of conductive leads or traces configured to conductively connect the controller to the first electrode 74 and the second electrode 84. An exemplary embodiment of the controller is discussed in reference to FIG. 7.

In some embodiments, the first electrode 74 and the second electrode 84 may correspond to an anode electrode and a cathode electrode. Though described as an anode and a cathode of the light generating device 70, the first electrode 74 and the second electrode 84 may be arranged such that the second electrode 84 (cathode) is disposed on the substrate and the first electrode 74 (anode) is disposed on the at least one dielectric layer 86. Additionally, a reflective layer which may be of a metallic reflective material may be disposed between the substrate 72 and the first electrode 74 to reflect light emitted from the cathode outward from the substrate 72 through the second electrode 84. The bus bars 76, 88 may be printed along opposite edges of the electrodes 74, 84 and electrically terminate at anode and cathode terminals. Points of connection between the bus bars 76, 88 and the power source may be at opposite corners of each bus bar 76, 88 for uniform current distribution along each bus.

Figure 4:
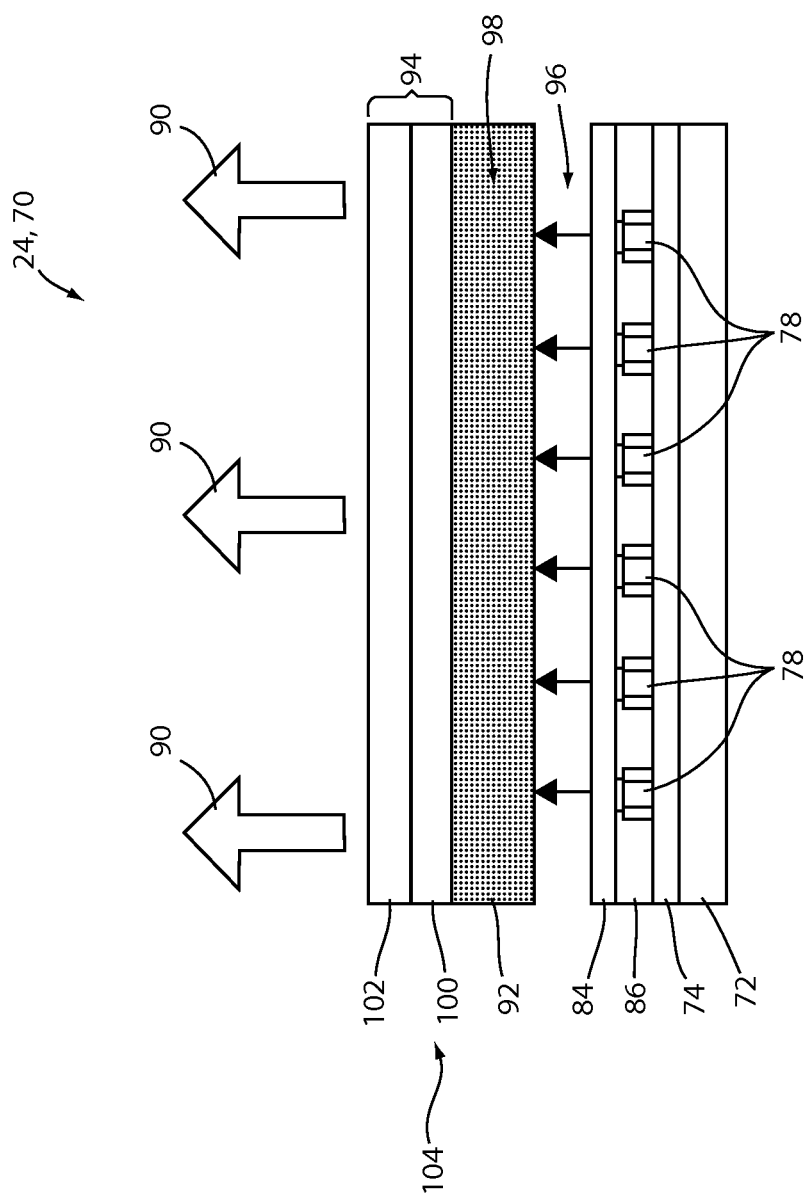
FIG. 4 is a detailed side view of a light producing assembly comprising a photoluminescent layer.

Still referring to FIG. 3, in some embodiments, a photoluminescent layer 92 may be applied to the second electrode 84 to form a backlit configuration of the light generating device 70. In some embodiments, the photoluminescent layer 92 may alternatively or additionally be configured in a front-lit configuration. The photoluminescent layer 92 may be applied as a coating, layer, film, and/or photoluminescent substrate to the second electrode 84 or any surface of the light generating device 70 configured to emit an output emission 90, for example the interior emission 40 or the exterior emission 46, therethrough. The output emission 90 is shown in FIG. 4. The photoluminescent layer 92 may be applied by screen printing, flexography, and/or otherwise affixed to the second electrode 84.

In various implementations, the LED emitters 78 may be configured to emit an excitation emission comprising a first wavelength corresponding to blue light. The LED emitters 78 may be configured to emit the excitation emission into the photoluminescent layer 92 such that the photoluminescent material becomes excited. In response to the receipt of the excitation emission, the photoluminescent material converts the excitation emission from the first wavelength to the output emission 90 comprising at least a second wavelength longer than the first wavelength. Additionally, one or more coatings 94 or sealing layers may be applied to an exterior surface of the light generating device 70 to protect the photoluminescent layer 92 and various other portions of the light generating device 70 from damage and wear.

Referring now to FIG. 4, a detailed view of photoluminescent layer 92 of the light generating device 70 in a backlit configuration is shown. The light generating device 70 is configured similar to the light generating device 70 demonstrated in FIG. 3, with like-numbered elements having the same or comparable function and structure. Though not shown in FIG. 4, the LED emitters 78 are in electrical communication with the bus bars 76, 88 and a power source via the controller such that the controller may selectively activate an excitation emission 96 from LED emitters 78.

In an exemplary implementation, the excitation emission 96 may comprise a first wavelength corresponding to a blue, violet, and/or ultra-violet spectral color range. The blue spectral color range comprises a range of wavelengths generally expressed as blue light (~440-500 nm). In some implementations, the first wavelength may comprise a wavelength in the ultraviolet and near ultraviolet color range (~100-450 nm). In an exemplary implementation, the first wavelength may be approximately equal to 470 nm. Though particular wavelengths and ranges of wavelengths are discussed in reference to the first wavelength, the first wavelength may generally be configured to excite any photoluminescent material.

In operation, the excitation emission 96 is transmitted into an at least partially light transmissive material of the photoluminescent layer 92. The excitation emission is emitted from the LED emitters 78 and may be configured such that the first wavelength corresponds to at least one absorption wavelength of one or more photoluminescent materials disposed in the photoluminescent layer 92. For example, the photoluminescent layer 92 may comprise an energy conversion layer 98 configured to convert the excitation emission 96 at the first wavelength to an output emission 90 having a second wavelength, different from the first wavelength. The output emission 90 may comprise one or more wavelengths, one of which may be longer than the first wavelength. The conversion of the excitation emission 96 to the output emission 90 by the energy conversion layer 98 is referred to as a Stokes shift.

In some embodiments, the output emission 90 may correspond to a plurality of wavelengths. Each of the plurality of wavelengths may correspond to significantly different spectral color ranges. For example, the at least second wavelength of the output emission 90 may correspond to a plurality of wavelengths (e.g. second, third, etc.). In some implementations, the plurality of wavelengths may be combined in the output emission 90 to appear as substantially white light. The plurality of wavelengths may be generated by a red-emitting photoluminescent material having a wavelength of approximately 620-750 nm, a green emitting photoluminescent material having a wavelength of approximately 526-606 nm, and a blue or blue green emitting photoluminescent material having a wavelength longer than the first wavelength and approximately 430-525 nm. In some implementations, a blue or blue green wavelength may correspond to the excitation emission being combined with the output emission 90. As discussed herein, a concentration of the photoluminescent material may be configured to allow at least a portion of the excitation emission to be emitted with the output emission 90 to add a blue hue to the output emission 90. The plurality of wavelengths may be utilized to generate a wide variety of colors of light from the each of the photoluminescent portions converted from the first wavelength. Though the particular colors of red, green, and blue are referred to herein, various photoluminescent materials may be utilized to generate a wide variety of colors and combinations to control the appearance of the output emission 90.

The photoluminescent materials, corresponding to the photoluminescent layer 92 or the energy conversion layer 98, may comprise organic or inorganic fluorescent dyes configured to convert the excitation emission 96 to the output emission 90. For example, the photoluminescent layer 92 may comprise a photoluminescent structure of rylenes, xanthenes, porphyrins, phthalocyanines, or other materials suited to a particular Stokes shift defined by an absorption range and an emission fluorescence. In some embodiments, the photoluminescent layer 92 may be of at least one inorganic luminescent material selected from the group of phosphors. The inorganic luminescent material may more particularly be from the group of Ce-doped garnets, such as YAG:Ce. As such, each of the photoluminescent portions may be selectively activated by a wide range of wavelengths received from the excitation emission 96 configured to excite one or more photoluminescent materials to emit an output emission having a desired color.

Still referring to FIG. 4, the light generating device 70 may further include the coating 94 as at least one stability layer 100 configured to protect the photoluminescent material contained within the energy conversion layer 98 from photolytic and/or thermal degradation. The stability layer 100 may be configured as a separate layer optically coupled and adhered to the energy conversion layer 98. The stability layer 100 may also be integrated with the energy conversion layer 98. The photoluminescent layer 92 may also optionally include a protection layer 102 optically coupled and adhered to the stability layer 100 or any layer or coating to protect the photoluminescent layer 92 from physical and chemical damage arising from environmental exposure.

The stability layer 100 and/or the protection layer 102 may be combined with the energy conversion layer 98 to form an integrated photoluminescent structure 104, for example through sequential coating or printing of each layer, or by sequential lamination or embossing. Additionally, several layers may be combined by sequential coating, lamination, or embossing to form a substructure. The substructure may then be laminated or embossed to form the integrated photoluminescent structure 104. Once formed, the photoluminescent structure 104 may be applied to a surface of at least one of the electrodes 74, 84 such that the excitation emission 96 received from the LED emitters 78 may be converted to the output emission 90. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

Figure 5:
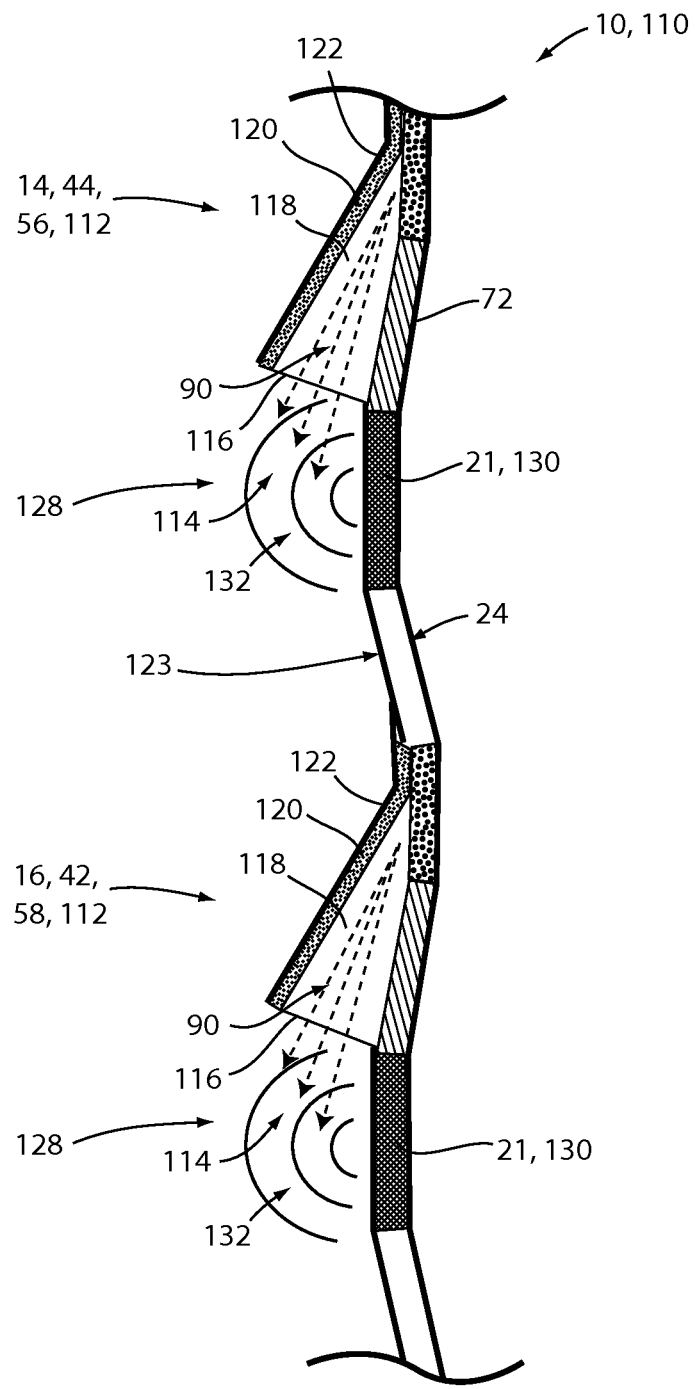
FIG. 5 is a side cross-sectional view of a illumination apparatus.

Referring to FIG. 5, a detailed cross-sectional view of an exemplary embodiment of the illumination apparatus 10 is shown. The particular embodiment shown in FIG. 5 may correspond to a directional illumination apparatus 110 configured to emit the output emission 90 from at least a first portion 42 or first light source of the illumination apparatus 110. Each of the first portion 42 and the second portion 44 may comprise the light generating device 70 configured as a light projecting assembly 112 on the circuit 24 in the form of a printed circuit board. Each of the light projecting assemblies 112 is configured to emit the output emission 90 along a projection direction 114 such that the output emission 90 is directed outward approximately normal to a projecting surface 116 of the light projecting assembly 112.

Each of the projecting assemblies 112 of the illumination apparatus 110 may further comprise an optic device 118, a reflective layer 120, and a surface layer 122. The optic device 118 may correspond to a light transmissive polymeric material insert molded over the light generating device 70. The optic device may comprise the projecting surface 116 and be configured to direct the output emission 90 therefrom. The reflective layer 120 may correspond to a reflective material applied to the optic device in a polymeric molding operation. The reflective material may correspond to a mold grade reflective polycarbonate material. The surface layer 122 may be molded over the reflective layer 120 and correspond to an opaque polymeric material configured to form a finish surface 123 or touch surface of the trim panel 26.

The light projecting assemblies 112 may correspond to each of the first portion 42 and the second portion 44 of the illumination apparatus 110. For example, the first portion 42 may comprise one or more light sources of the plurality of light sources 22. The first portion 42 may be configured to emit light to provide for the interior light 16 or map light function. The light emitted from the interior light 16 may correspond to the interior emission 40. In this configuration, a controller in communication with the directional illumination apparatus 110 may be operable to selectively activate at least the interior light 16 to illuminate a portion of the interior of the vehicle 12.

The controller may be operable to activate the interior light 16 in response to an input received by the one or more input sensors 21 in communication with the controller. Additionally, the controller may selectively activate the illumination apparatus 110 in response to one or more states of the vehicle 12. For example, the controller may be in communication with the door position sensor via a communication bus. In this configuration, the controller may illuminate the first portion 42 of the illumination apparatus 110 or the interior light 16 in response to various states of the vehicle 12. For example, the communication bus may be configured to communicate to the controller a drive selection of the vehicle, an ignition state, a door open or ajar status, a remote activation of the illumination apparatus 110, or any other information or control signals that may be utilized to activate or adjust an emission from the illumination apparatus 110.

The one or more input sensors 21 may correspond to proximity sensors configured to detect an object, for example a hand of a user proximate an outer surface 128 of the apparatus 110. The input sensor 21 may correspond to various forms of sensory devices including but not limited to resistive, infra-red, capacitive, and other forms of sensors. In an exemplary embodiment, the input sensor 21 may correspond to a capacitive proximity sensor 130 formed by printing conductive ink proximate the outer surface 128 of the apparatus 110. The capacitive proximity sensor 130 may comprise a drive electrode and a receive electrode, each having interdigitated fingers for generating an electric field 132. The drive electrode receives square wave drive pulses and the receive electrode has an output for generating an output voltage. Further details describing the capacitive proximity sensor 130 may be found at least in U.S. Pat. No. 9,065,447 B2 to Buttolo et al., entitled "PROXIMITY SWITCH ASSEMBLY AND METHOD HAVING ADAPTIVE TIME DELAY," FILED Apr. 11, 2012, which is incorporated herein by reference in its entirety.

The output voltage from the capacitive proximity sensor 130 may be identified by the controller to detect the object proximate thereto. In this configuration, the controller may detect the object in proximity to the one or more input sensors 21 to selectively activate the interior light 16. Though discussed in reference to the interior light 16, the controller may detect the object proximate the one or more input sensors 21 to selectively activate the entry light 14 and/or control a level of the interior light 16 and the entry light 14. In this way, the disclosure provides for the lighting apparatuses and systems that may be flexibly implemented on various trim panels throughout the vehicle 12.

In the closed position 36, the illumination apparatus 110 may be configured to selectively illuminate a second portion 44 or second light of the illumination apparatus 110. The second portion 44 may comprise one or more light sources of the plurality of light sources 22. The second portion 44 may be configured to emit light to provide for the entry light 14 or puddle light function. The light emitted from the entry light 14 may be referred as the exterior emission 46. The controller may selectively illuminate the exterior emission 46 in response to one or more states of the vehicle 12 and/or in response to an input received by the one or more input sensors 21. In operation, the output emission 90 in the form of the exterior emission may be configured to illuminate the entry region 54 proximate the vehicle 12.

The entry light 14 and the interior light 16 may be advantageously projected from the projecting surface 116 to serve as task lighting corresponding to the reading or map light and the entry or puddle light, respectively. As illustrated in FIG. 1, in the closed position 36, the interior light 16, emitted from the first portion 42, may be directed substantially toward a portion of a passenger seat 48. The portion of the passenger seat 48 may correspond to a passenger work area 50 or area where a seated passenger may comfortably hold a book or map for reading while seated in the passenger seat 48. In this configuration, the interior light 16 may be selectively activated to illuminate the passenger work area 50 while limiting light emitted throughout the passenger compartment 52 of the vehicle 12.

Referring again to FIG. 2, in some embodiments, the entry light 14 may further be configured to emit a warning emission 134 in response to the door being oriented in the open position 38. For example, the entry light 14 may be emitted from the second portion 44 directed substantially toward an entry region 54 proximate the door 18 to illuminate at least a portion of the entry region 54. Additionally, the warning emission 134 may be emitted from a warning light 136 disposed along a third portion 138 of the trim panel 26. In this configuration, the warning emission 134 may be directed from the warning light 136 in a rearward direction relative to a forward motion of the vehicle 12.

The warning light 136 may be directed substantially rearward from trim panel 26 when the door 18 is arranged in the open position 38. To achieve the direction of the warning emission 134, the warning light 136 may comprise at least one optic device that may be substantially similar to the optic device 118. The optic device may be of a substantially light transmissive polymeric material formed and/or molded to direct the warning emission 134 from the third portion 138 of the trim panel 26. The third portion 138 may correspond to a portion of the trim panel that may coincide with the first portion and/or the second portion 44 and may comprise one or more light sources similar to or corresponding to the plurality of light sources 22. In this configuration, the warning emission 134 may be emitted from the door 18 and the trim panel 26 to output light to warn an approaching vehicle that the door 18 is open.

The warning light 136 may comprise the light generating device 70 comprising a photoluminescent material as described herein. In this configuration, the warning emission 134 may correspond to one or more wavelengths of light configured to warn an approaching vehicle that the door 18 is in the opened position 38. The warning emission may correspond to a red, orange, or reddish-orange color to signal a potential hazard to an approaching vehicle.

Similar to the interior light 16 and the entry light 14, the controller may be in communication with the warning light 136. In this configuration, the controller may be operable to activate the warning light 136 in response to an input received by the one or more input sensors 21 and/or the door 18 being oriented in the opened position 38. The controller may also selectively activate the warning light 136 in response to one or more states of the vehicle 12. For example, the controller may be in communication with the door position sensor via a communication bus. In this configuration, the controller may illuminate the third portion 138 of the trim panel 26 in response to various states of the vehicle 12.

Figure 6:
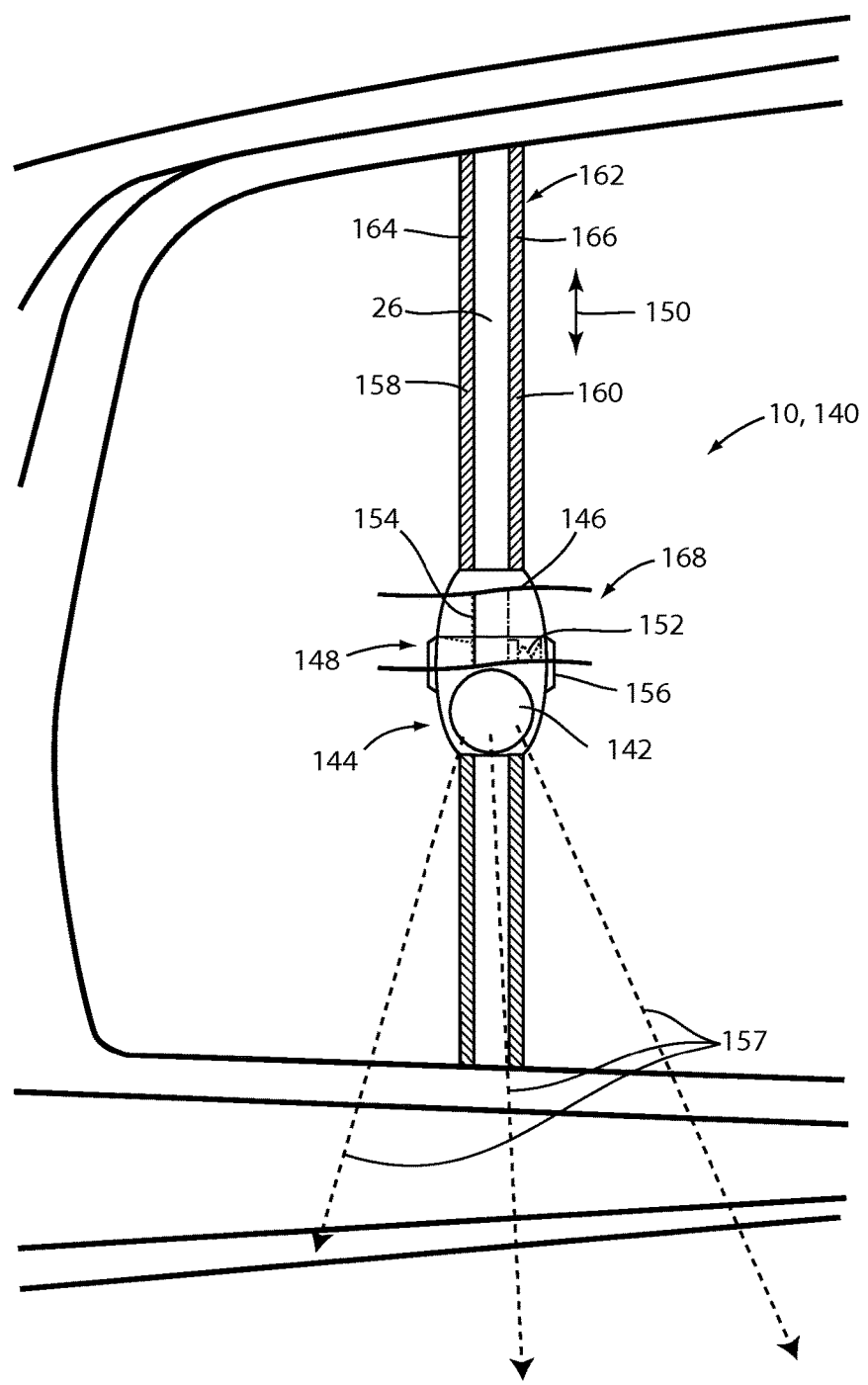
FIG. 6 is a detailed side view of a illumination apparatus.

Referring to FIG. 6, an exemplary implementation of an adjustable illumination apparatus 140 is shown. The adjustable illumination apparatus 140 may comprise the least one light source 142 as a portion of a circuit assembly 144 configured to generate the output emission 90 from the light generating device 70. The illumination apparatus 140 may comprise a housing 146 including a locating mechanism 148. The locating mechanism 148 may be in connection with the trim panel 26 or the window molding 32 of the vehicle 12. In an exemplary implementation, the locating mechanism 148 may comprise a slidable assembly configured to retain a position of the circuit assembly 144 along a longitudinal extent 150 of the trim panel 26.

The locating mechanism 148 may comprise a spring loaded assembly having a retention spring 152 configured to apply pressure to an engagement surface 154 via a locking detent 156 of the trim panel 26. The circuit assembly 144 may freely slide along the trim panel 26 when the locking detent 156 is depressed. The locating mechanism 148 may retain the position of the illumination apparatus 140 when the locking detent 156 is not depressed. In this configuration, a position of the circuit assembly 144 of the adjustable illumination apparatus 140 may be adjusted along the trim panel 26. The position may be adjusted such that an illumination emission 157 may be directed to various locations based on the position of the door 18 and the illumination apparatus 140 along the longitudinal extent 150.

A first terminal 158 and a second terminal 160 may extend along at least a portion of the trim panel 26 and may be disposed in a channel 162 extending along each of a first side 164 and a second side 166 of the trim panel 26. The terminals 158 and 160 may be conductively connected to the circuit assembly 144 and further in connection with the controller. The terminals 158 and 160 of the adjustable illumination apparatus 140 may correspond to a slidable interface 168 configured to provide for the adjustment of the position of the illumination apparatus 140 along the trim panel 26. Though described as the first side 164 and the second side 166 in reference to the embodiment illustrated in FIG. 6, the first terminal 158 and the second terminal 160 may extend along any portion of the trim panel 26 such that a conductive connection may be maintained with the circuit assembly.

The slidable interface 168 is configured to provide for the adjustment of the illumination apparatus along the longitudinal extent 150. The adjustment may be made while maintaining conductive contact between the circuit assembly 144 and the terminals 158 and 160. In this configuration, the controller may selectively activate the adjustable illumination apparatus 140. As shown in FIG. 6, the trim panel 26 may correspond to the window molding 32 configured to bisect the first window 28 and the second window 30 and may be configured to slideably engage at least one of the first window 28 and the second window 30.

Figure 7:
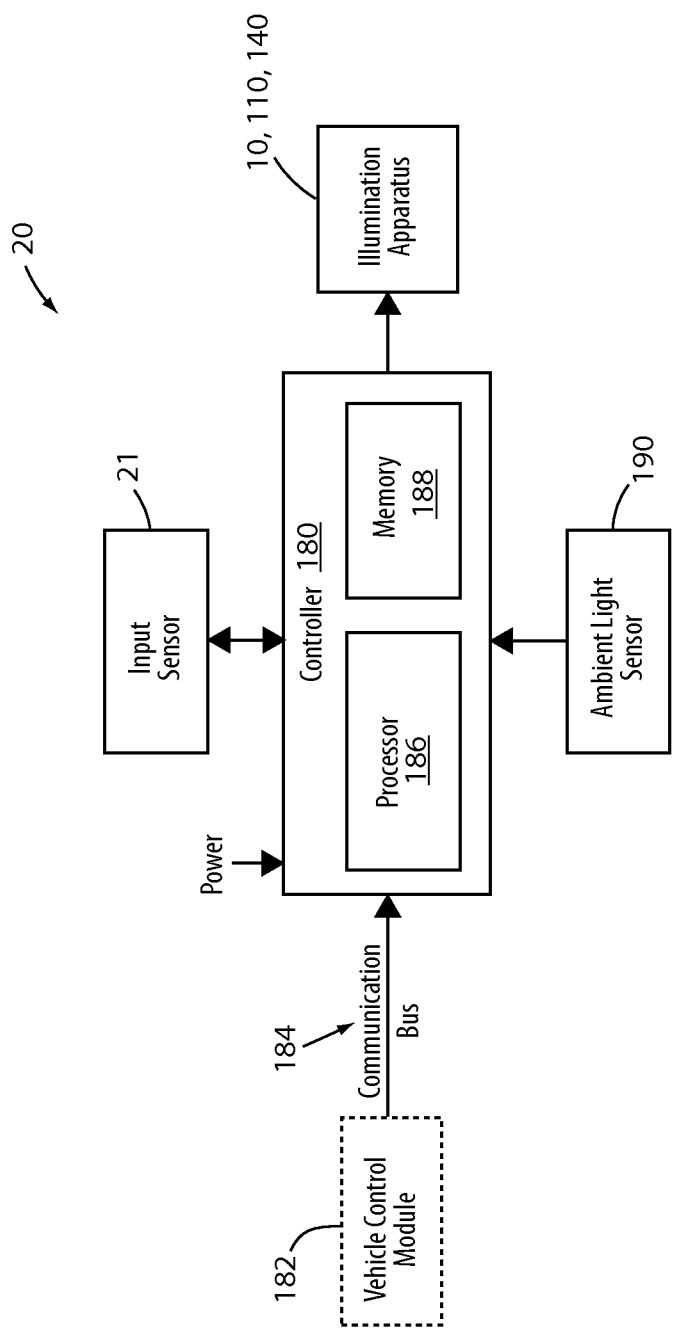
FIG. 7 is a block diagram of an illumination apparatus in accordance with the disclosure.

Referring to FIG. 7, a block diagram corresponding to the illumination apparatus 10 is shown. The controller 180 is in communication with the illumination apparatus 10 via the electrical supply busses discussed herein. The controller 180 may be in communication with the vehicle control module 182 via a communication bus 184 of the vehicle 12. The communication bus 184 may be configured to deliver signals to the controller 180 identifying various vehicle states. For example, the communication bus 184 may be configured to communicate to the controller 180 a drive selection of the vehicle, an ignition state, a door open or ajar status, a remote activation of the illumination apparatus 10, or any other information or control signals that may be utilized to activate or adjust the output emission 90. Though the controller 180 is discussed herein, in some embodiments, the illumination apparatus 10 may be activated in response to an electrical or electro-mechanical switch in response to a position of a closure (e.g. a door, hood, truck lid, etc.) of the vehicle.

The controller 180 may comprise a processor 186 comprising one or more circuits configured to receive the signals from the communication bus 184 and output signals to control the illumination apparatus 10 to control the output emission 90. The processor 186 may be in communication with a memory 188 configured to store instructions to control the activation of the illumination apparatus 10. The controller 180 may further be in communication with an ambient light sensor 190. The ambient light sensor 190 may be operable to communicate a light condition, for example a level brightness or intensity of ambient light proximate the vehicle 12. In response to the level of the ambient light, the controller 180 may be configured to adjust a light intensity output from the illumination apparatus 10. The intensity of the light output from the illumination apparatus 10 may be adjusted by the controller 180 by controlling a duty cycle, current, or voltage supplied to the illumination apparatus 10.

The controller may further be in communication with the at least one input sensor 21. The input sensor 21 may correspond to various forms of sensory devices including but not limited to resistive, infra-red, capacitive, and other forms of sensors. In an exemplary embodiment, the input sensor 21 may correspond to the capacitive proximity sensor 130 formed by printing conductive ink proximate the outer surface 128 of the illumination apparatus 10. An output voltage from the input sensor may be identified by the controller 180 to detect an object, for example a hand or digit of a passenger of the vehicle 12, proximate thereto. In this configuration, the controller 180 may detect the object in proximity to the one or more input sensors 21 to selectively activate one or more of the light generating devices 70 of the illumination apparatuses 10, 110, and 140 discussed herein.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. An illumination apparatus for a vehicle comprising:
a circuit disposed on a trim panel comprising:
first and second proximity sensors disposed proximate a surface of the trim panel and configured to detect a presence of an object;
a first light source disposed proximate the first proximity sensor, and a second light source disposed proximate the second proximity sensor, the first and second light sources comprising a plurality of LEDs in a semiconductor ink;

a first reflective surface configured to reflect the first light source at a first emission angle, and a second reflective surface configured to reflect the second light source at a second emission angle; and the first proximity sensor configured to selectively activate the first light source, and the second proximity sensor configured to selectively activate the second light source, wherein the trim panel corresponds to a molding configured to seal a first window to a second window.

2. The apparatus according to claim 1, wherein the trim panel is further configured to engage the second window.

3. The apparatus according to claim 1, further comprising a controller configured to control the first and second light sources, wherein the controller selectively activates the first and second light sources to emit a first emission.

4. The apparatus according to claim 3, wherein the first and second light sources comprise a photoluminescent layer configured to convert the first emission from at least one emitter of the light sources to a second emission.

5. The apparatus according to claim 4, wherein the first emission corresponds to a first color and the second emission corresponds to a second color different than the first color.

6. The apparatus according to claim 4, wherein the photoluminescent layer comprises an organic photoluminescent dye.

7. An illumination apparatus for a vehicle comprising:
a circuit disposed on a window molding of a door comprising a plurality of light sources;
at least one proximity sensor disposed proximate a surface of a trim panel;
a controller in communication with the at least one proximity sensor to control at least a first light source of the plurality of light sources to illuminate in response to a proximity detection and to control at least a second light source of the plurality of light sources to illuminate in response to a door open status signal; and
wherein the window molding forms an arched configuration tapering toward a roof position of the vehicle, the arched configuration directing a first emission from the first light source at a larger angle than a second emission from the second light source relative to a vertical vector of the vehicle.

8. The illumination apparatus according to claim 7, wherein the arched configuration positions the second light source to direct the second emission substantially downward relative to the vertical vector providing a puddle lamp when the door is in an open configuration.

9. The illumination apparatus according to claim 7, wherein the first light source is located on a lower portion of the window molding.

10. The illumination apparatus according to claim 7, wherein the second light source is located on an upper portion of the window molding.

11. The illumination apparatus according to claim 7, wherein at least one of the plurality of light sources comprises a plurality of LEDs printed in a semiconductor ink.

12. A lighting apparatus for a vehicle comprising:
a locating mechanism configured to retain a position of a circuit assembly along a longitudinal extent of a trim panel;
at least one light source disposed on the circuit assembly electrically coupled to a plurality of electrodes disposed on the trim panel such that the circuit assembly is adjustable along the longitudinal extent;
the circuit assembly in connection with the trim panel along a slideable interface, the slideable interface comprising a locking detent; and
wherein the circuit assembly is configured to slide along the trim panel when the locking detent is depressed, and the locating mechanism is configured to secure the position of the circuit assembly in a desired position when the locking detent is not depressed.

13. The assembly according to claim 12, wherein the circuit assembly is operable to illuminate the at least one light source in a plurality of positions along the longitudinal extent.

14. The assembly according to claim 12, wherein the trim panel corresponds to a window molding configured to engage at least one window of the vehicle.

15. The assembly according to claim 14, wherein the window molding is configured to bisect a first window and a second window and slideably engage at least one of the first window and the second window.

16. The assembly according to claim 12, wherein the locating mechanism comprises a spring loaded assembly having a retention spring configured to apply pressure to an engagement surface of the locking detent in order to enable sliding of the circuit assembly along the trim panel.

* * * * *